UNITED STATES PATENT OFFICE.

JOSEPH BIBBY AND JAMES BIBBY, OF LIVERPOOL, ENGLAND.

MANUFACTURE OF PRINTING-INK.

SPECIFICATION forming part of Letters Patent No. 519,032, dated May 1, 1894.

Application filed July 31, 1893. Serial No. 481,991. (No specimens.)

*To all whom it may concern:*

Be it known that we, JOSEPH BIBBY and JAMES BIBBY, subjects of the Queen of Great Britain and Ireland, residing at Liverpool, England, have invented an Improvement in the Manufacture of Printing-Ink, of which the following is a specification.

This invention relates to the employment, as a basic ingredient in the manufacture of black, blue and analogously colored printing inks, of the oily matter commonly known as cotton seed oil foots, a soapy product obtained in the refining of cotton seed oil and possessed of a deep bluish-black color, in combination with varying proportions of burned, boiled or raw linseed oil, resin or other varnish forming ingredients ordinarily used in the manufacture, according to the intended use of the ink, and with a sufficiency of lamp-black, vegetable black, Prussian blue, indigo, or other appropriate coloring matter ordinarily used in the manufacture to acquire any peculiar desired depth of tint; the cotton seed oil foots being used as the basis or principal ingredient, say from about seventy-five per cent. of the total ingredients downward, in substitution mainly for the linseed oil ordinarily used in such manufacture as the basis of the ink or for such portion thereof as it displaces, and for the soap ordinarily used in such manufacture; and being of advantage in that, while it is a much more economic basis of the ink than is the linseed oil, correspondingly reducing the cost of production, and avoids the use of soap as an ingredient, the resultant ink is, nevertheless, equal in quality and in all desired properties to the best inks now in use having the more expensive basis and having soap as an ingredient. A further great advantage is that the cotton seed oil foots, being possessed of a deep bluish-black color, sufficiently tints the ink for many purposes without the addition of any coloring matter, and necessitates the employment of a much less quantity of the usual expensive pigments should it be required to acquire any peculiar depth of tint, thus further reducing the cost of manufacture in respect of lessening the amount of coloring ingredients used and the necessary grinding to reduce the grittiness of such coloring matters when used.

From about ten per cent. to twenty per cent. of the total of the cotton seed oil foots used may be used in its natural soapy state after evaporating all the contained water, in substitution for the soap ordinarily used, the remainder of the cotton seed oil foots used being used, in substitution for the linseed oil or for such proportion thereof as it displaces, after its soapy nature has been neutralized by means of any suitable acid, such neutralization being effected after evaporation of the great excess of the contained water, and the foots so treated being employed after evaporation of its remaining contained water. In the manufacture of the ink, the other oily, resinous, or other varnish forming ingredients of the ink are added to such an admixture of the natural and neutralized cotton seed oil foots in the proportions deemed best according to the purpose for which the ink is intended to be used, and are intimately mixed therewith and boiled in a usual manner. Such coloring matter as may be required is then added, and the admixture may be ground to reduce the gritty matter due to the addition of the coloring matter used.

We claim as our invention—

1. In the manufacture of black, blue and analogously colored printing inks, the combination, of cotton seed oil foots, as a basic ingredient, with varying proportions of linseed oil or other varnish forming ingredients ordinarily used in such manufacture, as set forth.

2. In the manufacture of black, blue and analogously colored printing inks, the combination, of cotton seed oil foots, as a basic ingredient, with varying proportions of linseed oil or other varnish forming ingredients ordinarily used in such manufacture, and with lamp black, or other appropriate coloring matters, as set forth.

3. In the manufacture of black, blue, and analogously colored printing inks, the combination, of an admixture of cotton seed oil foots deprived of its contained water but otherwise in its natural condition and of cotton seed oil foots deprived of its contained water and neutralized as to its soapy nature by a suitable acid, in the relative proportions of about ten per cent. to twenty per cent. of the former and about ninety per cent. to eighty per cent. of the latter; as a basic ingredient, with varying proportions of linseed oil or other varnish forming ingredients ordinarily used in such manufacture, as set forth.

4. In the manufacture of black, blue and analogously colored printing inks, the combination, of an admixture of cotton seed oil foots deprived of its contained water but otherwise in its natural condition and of cotton seed oil foots deprived of its contained water and neutralized as to its soapy nature by a suitable acid, in the relative proportions of about ten per cent. to twenty per cent. of the former and about ninety per cent. to eighty per cent. of the latter, as a basic ingredient, with varying proportions of linseed oil or other varnish forming ingredients ordinarily used in such manufacture, and with lampblack, or other appropriate coloring matters, as set forth.

In testimony whereof we have signed our names to this specification in the presence of two subscribing witnesses.

JOSEPH BIBBY.
JAMES BIBBY.

Witnesses:
N. WARDROP,
A. E. KIRK,
*Both of* 14 *Water Street, Liverpool, Clerks.*